United States Patent
Baskin et al.

(10) Patent No.: US 11,174,017 B2
(45) Date of Patent: Nov. 16, 2021

(54) ROTOR BLADE FOLDING SYSTEM

(71) Applicant: Lockheed Martin Corporation, Bethesda, MD (US)

(72) Inventors: Bryan Kenneth Baskin, Arlington, TX (US); Robert D. Higbie, Haslet, TX (US); Chris P. Butler, Frisco, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 235 days.

(21) Appl. No.: 16/426,781

(22) Filed: May 30, 2019

(65) Prior Publication Data

US 2020/0377205 A1 Dec. 3, 2020

(51) Int. Cl.
*B64C 27/50* (2006.01)
*B64C 27/04* (2006.01)

(52) U.S. Cl.
CPC .............. *B64C 27/50* (2013.01); *B64C 27/04* (2013.01)

(58) Field of Classification Search
CPC .................................. B64C 27/50; B64C 3/56
See application file for complete search history.

(56) References Cited

U.S. PATENT DOCUMENTS

| | | | |
|---|---|---|---|
| 6,036,442 A | 3/2000 | Certain et al. | |
| 9,108,727 B2* | 8/2015 | Hoover | B64C 27/50 |
| 9,359,071 B2* | 6/2016 | Kuntze-Fechner | B64C 27/50 |
| 2015/0078909 A1 | 3/2015 | Wiinikka et al. | |

* cited by examiner

*Primary Examiner* — Richard A Edgar
(74) *Attorney, Agent, or Firm* — Foley & Lardner LLP (57) ABSTRACT

A foldable rotor blade assembly includes a first section including a connector assembly including a plurality of through holes and a second section including a connector having a plurality of openings. The connector is receivable within a hollow interior of the first section. A plurality of fasteners insertable within the plurality of through holes and the plurality of openings. A fold assembly is operably coupled to both the first section and the second section. The fold assembly defines a blade fold axis about which the second section is rotatable to transform the rotor blade assembly between a normal configuration when the connector is received within the hollow interior of the first section, and a folded configuration when the connector has rotated outside of the hollow interior of the first section.

21 Claims, 10 Drawing Sheets

ROTOR BLADE FOLDING SYSTEM

BACKGROUND

The embodiments disclosed herein relate to a blade assembly of a rotary wing aircraft, and more particularly to a blade assembly operable to fold about a blade fold axis.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, existing blade fold systems are cumbersome and are susceptible to drag, thereby decreasing the efficiency of the rotary wing aircraft in flight.

BRIEF DESCRIPTION

According to an embodiment, a foldable rotor blade assembly includes a first section including a connector assembly including a plurality of through holes and a second section including a connector having a plurality of openings. The connector is receivable within a hollow interior of the first section. A plurality of fasteners insertable within the plurality of through holes and the plurality of openings. A fold assembly is operably coupled to both the first section and the second section. The fold assembly defines a blade fold axis about which the second section is rotatable to transform the rotor blade assembly between a normal configuration when the connector is received within the hollow interior of the first section, and a folded configuration when the connector has rotated outside of the hollow interior of the first section.

In addition to one or more of the features described above, or as an alternative, in further embodiments the plurality of through holes includes at least three through holes.

In addition to one or more of the features described above, or as an alternative, in further embodiments the plurality of through holes are arranged in a non-linear configuration.

In addition to one or more of the features described above, or as an alternative, in further embodiments the plurality of through holes form a triangle.

In addition to one or more of the features described above, or as an alternative, in further embodiments an axis defined by one of the plurality of through holes is perpendicular to and intersects a pitch axis of the rotor blade assembly.

In addition to one or more of the features described above, or as an alternative, in further embodiments the plurality of through holes are symmetrically positioned about the pitch axis.

In addition to one or more of the features described above, or as an alternative, in further embodiments when the rotor blade assembly is in the normal configuration, each of the plurality of through holes is aligned with a corresponding one of the plurality of openings.

In addition to one or more of the features described above, or as an alternative, in further embodiments an end of the connector is contoured such that the connector does not contact with first section as the second section rotates about the blade fold axis.

In addition to one or more of the features described above, or as an alternative, in further embodiments the contoured end of the connector is generally rounded.

In addition to one or more of the features described above, or as an alternative, in further embodiments a centerline of a radius of the connector is aligned with the blade fold axis.

In addition to one or more of the features described above, or as an alternative, in further embodiments the fold assembly further comprises a first hinge plate coupled to the first section, a second hinge plate fastened to the second section, and a pin connecting the first hinge plate to the second hinge plate.

In addition to one or more of the features described above, or as an alternative, in further embodiments in the folded configuration, the second section is supported by the fold assembly.

In addition to one or more of the features described above, or as an alternative, in further embodiments comprising at least one fairing positioned about the fold assembly.

In addition to one or more of the features described above, or as an alternative, in further embodiments the at least one fairing further comprises a first fairing mounted to the first section and a second fading mounted to the second section, wherein an end of the first fairing and an adjacent end of the second fairing are generally complementary.

According to another embodiment, a rotary-wing aircraft includes an airframe and a main rotor system supported by the airframe. The main rotor system includes a plurality of rotor blade assemblies connected to a rotor hub. The plurality of rotor blade assemblies include a first rotor blade assembly rotatable about a first blade fold axis defined by a first fold assembly mounted to a leading edge of the first rotor blade assembly and a second rotor blade assembly rotatable about a second blade fold axis defined by a second fold assembly mounted to a trailing edge of the second rotor blade assembly. The first rotor blade assembly is positioned directly adjacent to the second rotor blade assembly about the rotor hub.

In addition to one or more of the features described above, or as an alternative, in further embodiments each of the first rotor blade assembly and the second rotor blade assembly further comprises a first section including a connector assembly including a plurality of through holes, a second section including a connector having a plurality of openings, the connector being receivable within a hollow interior of the first section and a plurality of fasteners, each of the plurality of fasteners is insertable within one of the plurality of through holes and one of the plurality of openings.

In addition to one or more of the features described above, or as an alternative, in further embodiments the first rotor blade assembly further comprises at least one fairing positioned about the first fold assembly and the second rotor blade assembly further comprises at least one fairing positioned about the second fold assembly.

In addition to one or more of the features described above, or as an alternative, in further embodiments the at least one fairing further comprises a first fairing mounted to the first section and a second fairing mounted to the second section, wherein an end of the first fairing and an adjacent end of the second fairing are generally complementary.

In addition to one or more of the features described above, or as an alternative, in further embodiments the first rotor blade assembly and the second rotor blade assembly are mounted opposite one another, and the first rotor blade assembly is foldable about the first blade fold axis relative to the rotor hub in a first direction, and the second rotor blade assembly is foldable about the second blade fold axis relative to the rotor hub in a second direction opposite the first direction.

In addition to one or more of the features described above, or as an alternative, in further embodiments the first rotor blade assembly and the second rotor blade assembly are mounted opposite one another, and the first rotor blade assembly is foldable about the first blade fold axis relative to the rotor hub in a first direction, and the second rotor blade assembly is foldable about the second blade fold axis relative to the rotor hub in the same first direction.

In addition to one or more of the features described above, or as an alternative, in further embodiments the first rotor blade assembly and the second rotor blade assembly are mounted adjacent one another and the first rotor blade assembly is foldable about the first blade fold axis relative to the rotor hub in a first direction, and the second rotor blade assembly is foldable about the second blade fold axis relative to the rotor hub in the same first direction.

In addition to one or more of the features described above, or as an alternative, in further embodiments the plurality of rotor blade assemblies are folded relative to the rotor hub in a single direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
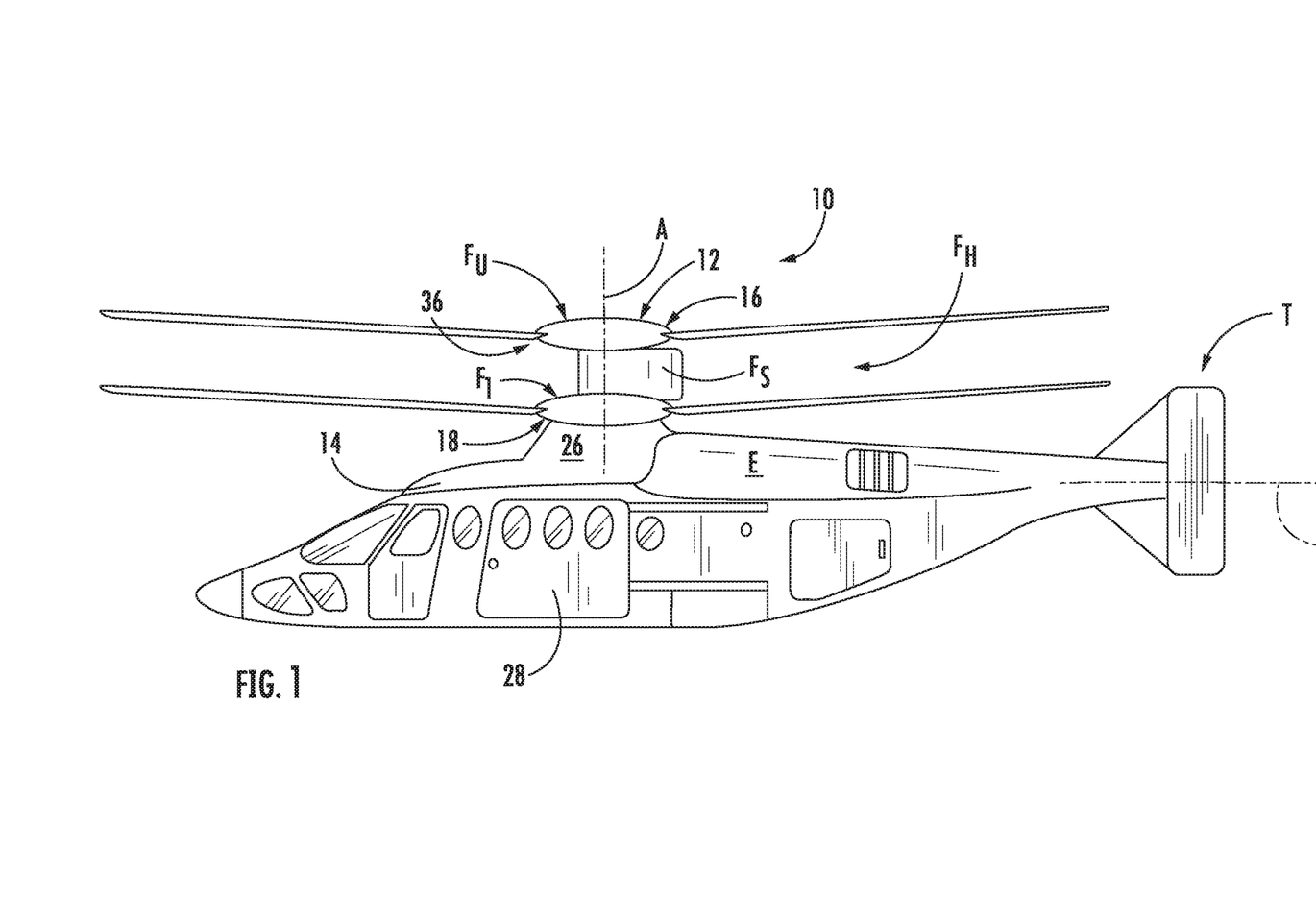
FIG. 1 is a side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems, as well as conventional single rotor systems and fixed wing aircraft will also benefit from the present invention.

A main gearbox 26 drives the rotor system 12. The translational thrust system T may also be driven by the main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
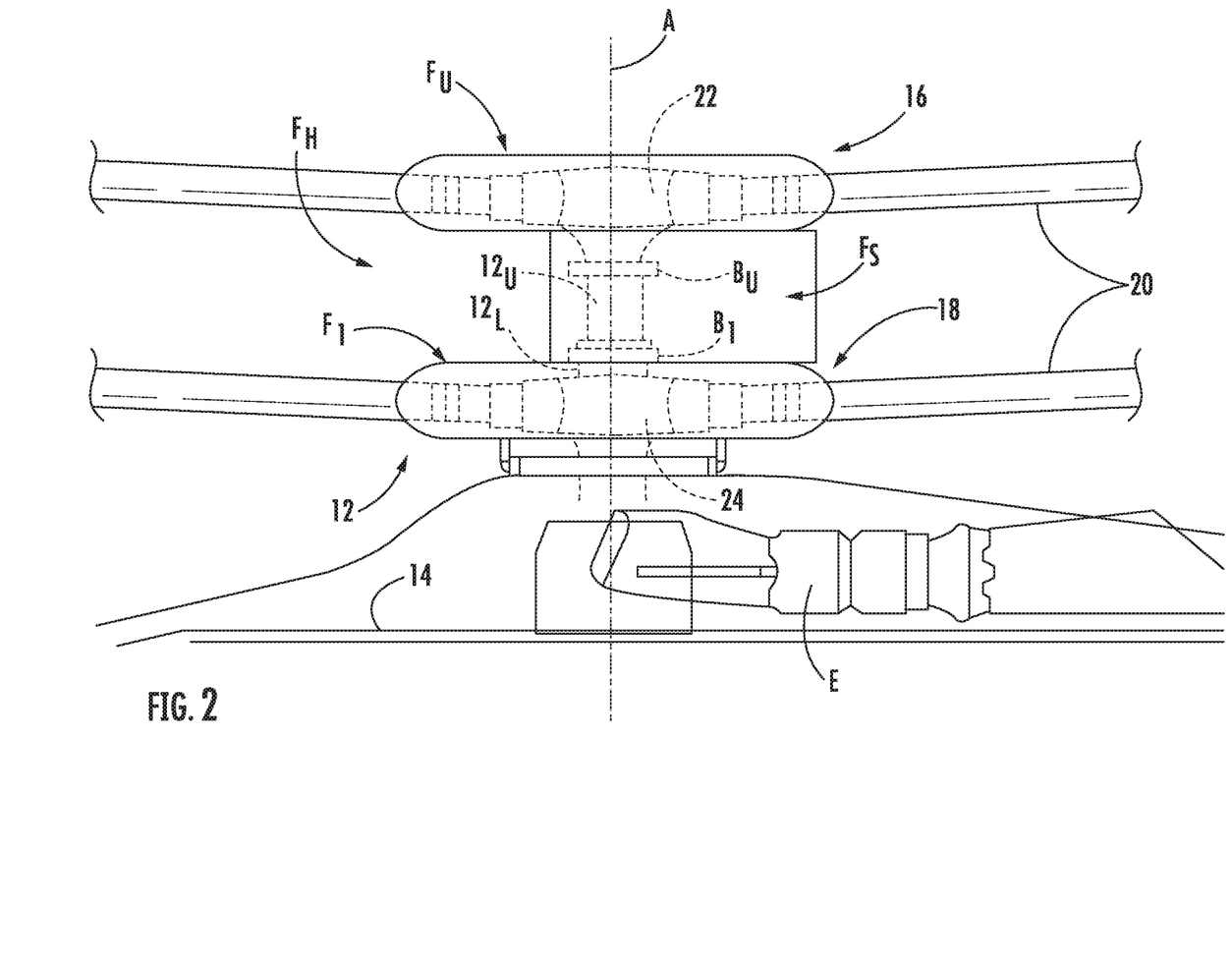
FIG. 2 is a cross-sectional view of a main rotor system of the aircraft illustrated in FIG. 1.
Figure 3:
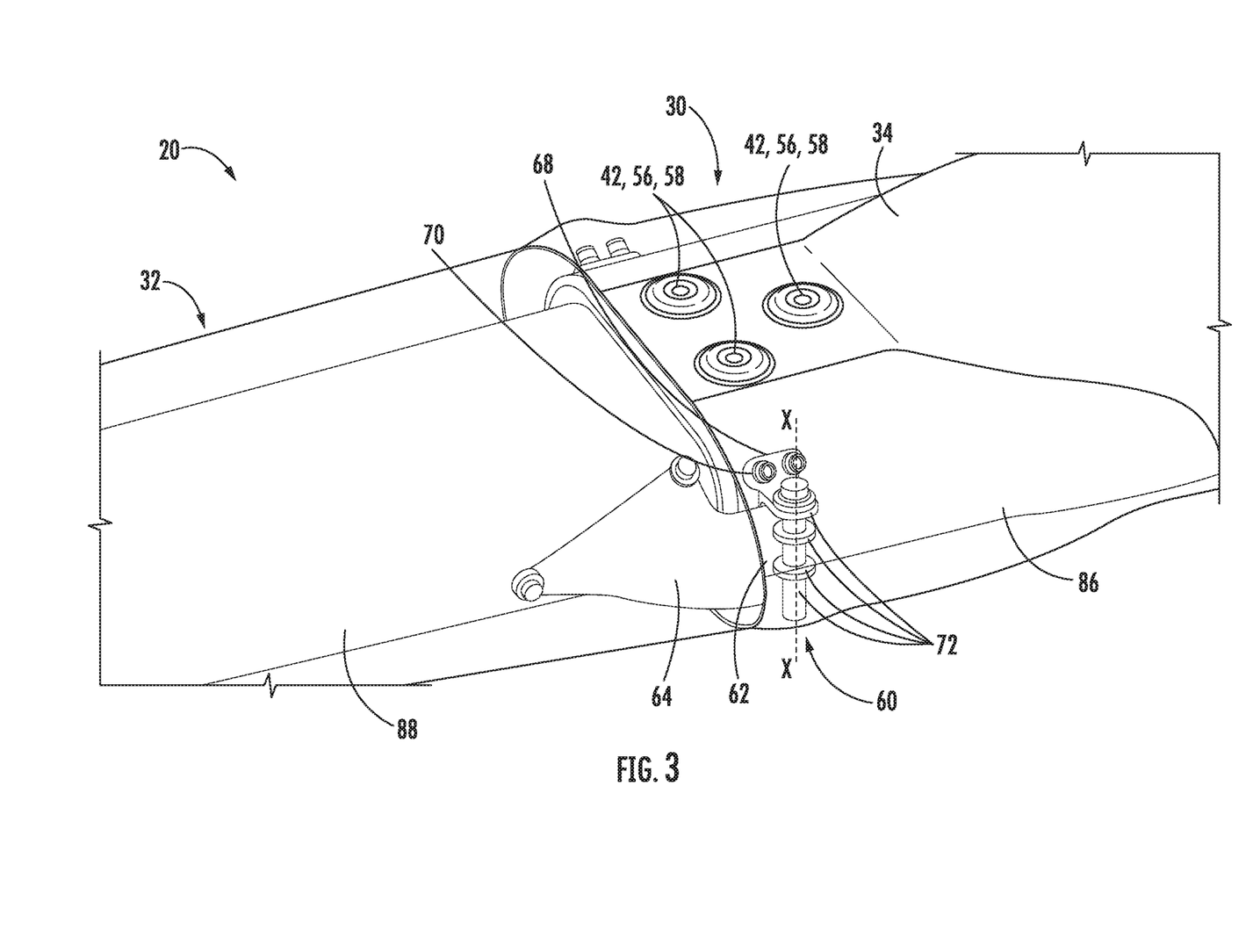
FIG. 3 is a perspective view of a portion of a rotor blade assembly in a normal configuration according to an embodiment.
Figure 4:
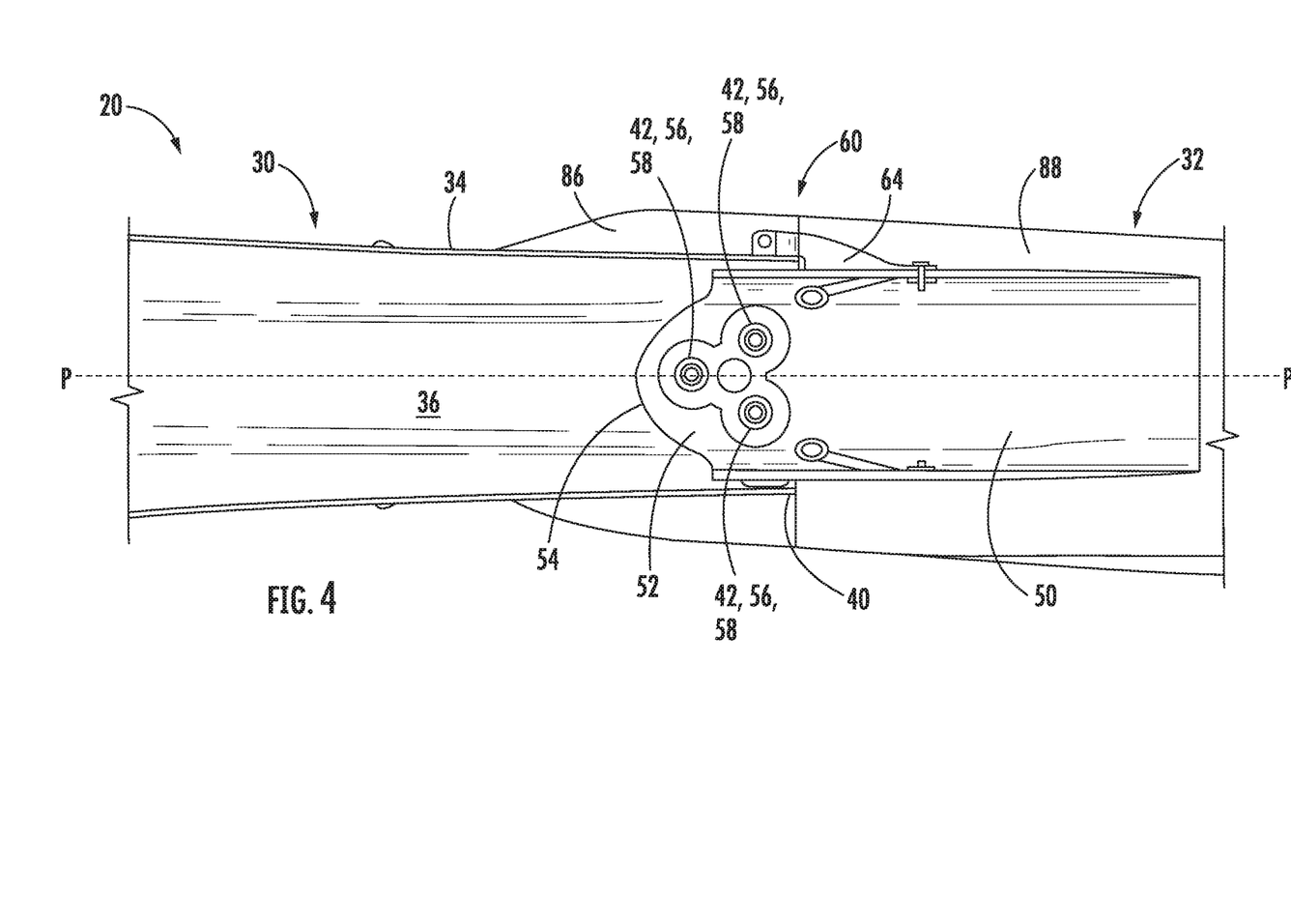
FIG. 4 is a plan view of a portion of a rotor blade assembly in a normal configuration according to an embodiment.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the rotor blade assemblies 20 project radially outward from the rotor hub assemblies 22, 24. Any number of rotor blade assemblies 20 may be used with rotor system 12.

In an embodiment, the rotor system 12 also includes a rotor hub fairing system Fh generally located between and around the upper and lower rotor systems 16, 18 such that the rotor hub assemblies 22, 24 are at least partially contained therein. The shown rotor hub fairing system Fh preferably includes an upper hub fairing Fu, a lower hub fairing Fl and a shaft fairing Fs there between. As shown, the shaft fairing Fs is attached to the counter-rotating, coaxial rotor system 12 through at least one bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper hearing Bu is preferably attached to one rotor shaft 12U while the lower bearing Bl attached to the other rotor shaft 12L such that the bearings Bu, Bl counter-rotate and net bearing drag is relatively low. However, it is understood that other fairing systems and attachment mechanisms can be used, and that aspects may not use bearing arrangements as shown.

At least one of the plurality of rotor blade assemblies 20 is configured to fold about a blade fold axis. Referring now to FIGS. 3-8, an example of a foldable rotor blade assembly 20, such as of the upper or lower rotor system 16, 18 for example, is illustrated in more detail. As shown, the rotor blade assembly 20 is divided into a first section 30 and a complementary second section 32. In an embodiment, the first section 30 includes an attachment member 34, such as a blade cuff for example. The attachment member 34 has a generally hollow interior 36 and is mountable at a first end (not shown) to a rotor hub assembly, such as rotor hub assembly 22 or rotor hub assembly 24 for example.

A connecting assembly 38 is arranged adjacent the second end 40 of the attachment member 34. As shown, the connecting assembly 38 includes at least one through hole 42 extending through the attachment member 34 and at least one support plate 44 mounted to an interior surface 46 of the attachment member 34 adjacent to the at least one through hole 42. In the illustrated, non-limiting embodiment, the connecting assembly 38 includes a plurality of through holes 42, and more specifically, three through holes, and the support plate 44 is sized to overlap with each of the through holes 42 formed in the attachment member 34. The plurality of through holes 42 may be substantially identical, or alternatively, one or more of the through holes 42 may vary in size. It should be understood that embodiments having any number of through holes 42, such as one, two, or more than three through holes 42 are also within the scope of the disclosure.

In embodiments of the connecting assembly 38 including a plurality of through holes 42, the through holes 42 are arranged in a non-linear configuration. As shown, the plurality of through holes 42 are positioned in a triangular configuration. In an embodiment, a first through hole 42 and a second through hole 42 are positioned such that the line defined by the first and second through holes 42 is disposed adjacent and parallel to the adjacent end of the attachment member 34. Further, the third through hole 42 may be offset from the first and second through holes 42 in two directions. As will be described in more detail below, the triangular configuration of the plurality of through holes 42 facilitates folding of the rotor blade assembly 20 without requiring deep cutouts in the attachment member 34 that would affect the structural efficiency.

Further, one of the plurality of through holes 42 may be located such that the vertical axis defined by the one through hole 42 is perpendicular to and intersects a pitch axis of the rotor blade assembly 20. The remainder of the plurality of through holes 42 may be symmetrical relative to the pitch axis P of the rotor blade assembly 20.

The second section 32 of the rotor blade assembly 20 includes a blade spar 50 having another connector 52 coupled to or integrally formed with the end 54 of the blade spar 50, adjacent the first section 30. The connector 52 includes at least one opening or through hole 56 complementary a respective through hole 42 formed in the connecting assembly 38 of the first section 30. In an embodiment, the total number of openings 56 formed in the connector 52 is equal to the total number of through holes 42 formed in the connecting assembly 38. Accordingly, when the rotor blade assembly 20 is in an extended configuration, the connector 52 is positioned within the hollow interior 36 of the attachment member 34, and each opening 56 is axially aligned with a corresponding though hole 42 (see FIG. 5). A fastener or pin 58 is positionable within each aligned through hole 42 and the opening 56 to selectively couple the first and second sections 30, 32. When the first and second sections 30, 32 are affixed via the fasteners 58, relative movement between the first section 30 and the second section 32 of the rotor blade assembly 20 is prevented. While not required, the fasteners 58 may be a hollow shear pin to provide sufficient bearing area for a composite blade assembly 20, with a smaller tension bolt to reduce torque required to apply adequate preload, which enables the fastener 58 to be removed and the joint to be folded using hand tools instead of hydraulic torque wrenches or torque multipliers.

Figure 6:
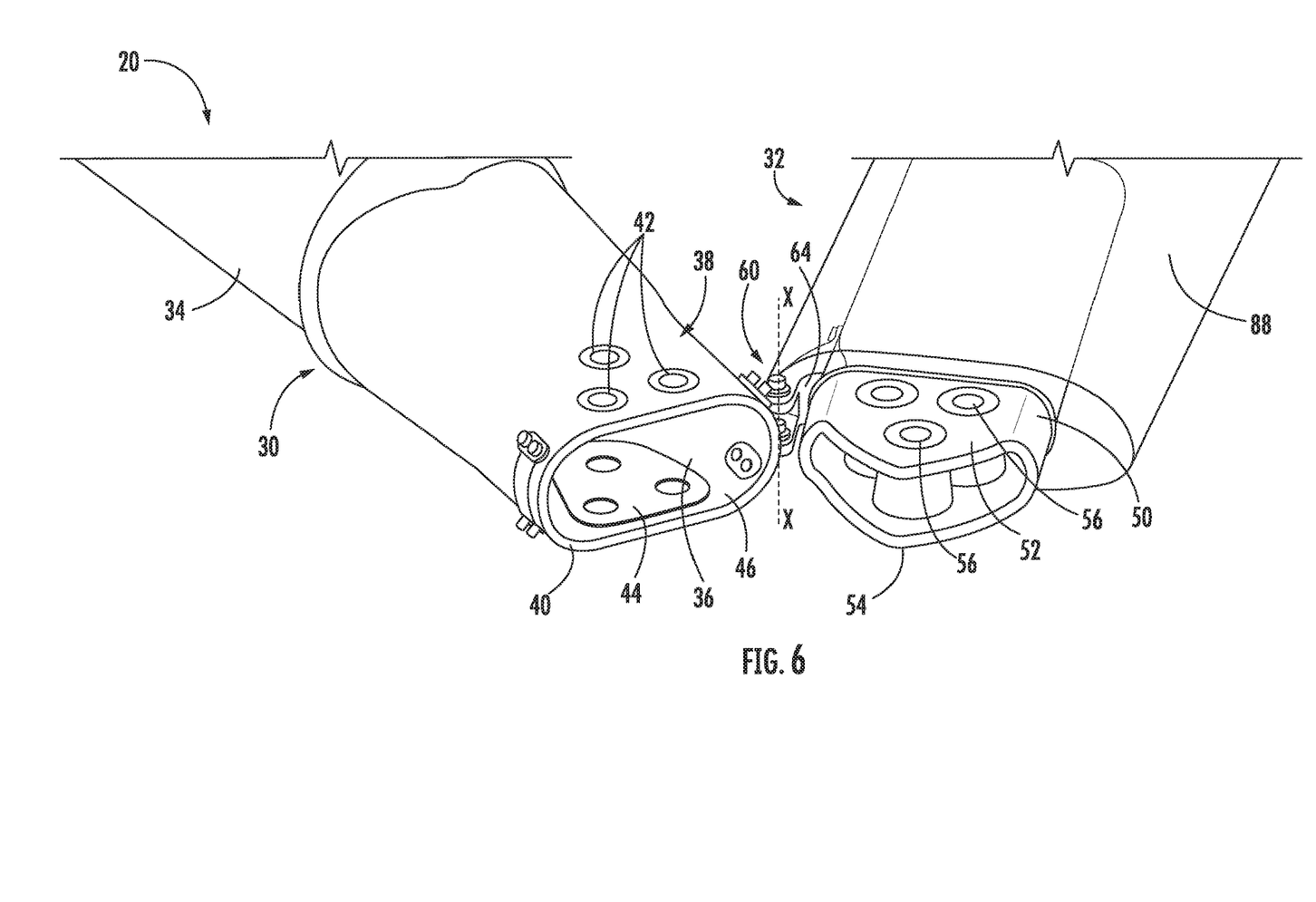
FIG. 6 is a perspective view of a portion of a rotor blade assembly in a folded configuration according to an embodiment.

As best shown in FIG. 6, the connector 52 of the second section 32 of the rotor blade assembly 20 is receivable within a hollow interior 36 of the first section 30 of the rotor blade assembly 20. In an embodiment, the end 54 of the connector 52 is contoured to facilitate movement of the second section 32 relative to the first section 30 without interference. As shown, the end 54 of the connector 52 may be generally rounded to a centrally located point or axis. In an embodiment, a centerline of the radius that defines the curve of the connector 52 is aligned with the blade fold axis X. However, other suitable contours and configurations are also within the scope of the disclosure.

Figure 5:
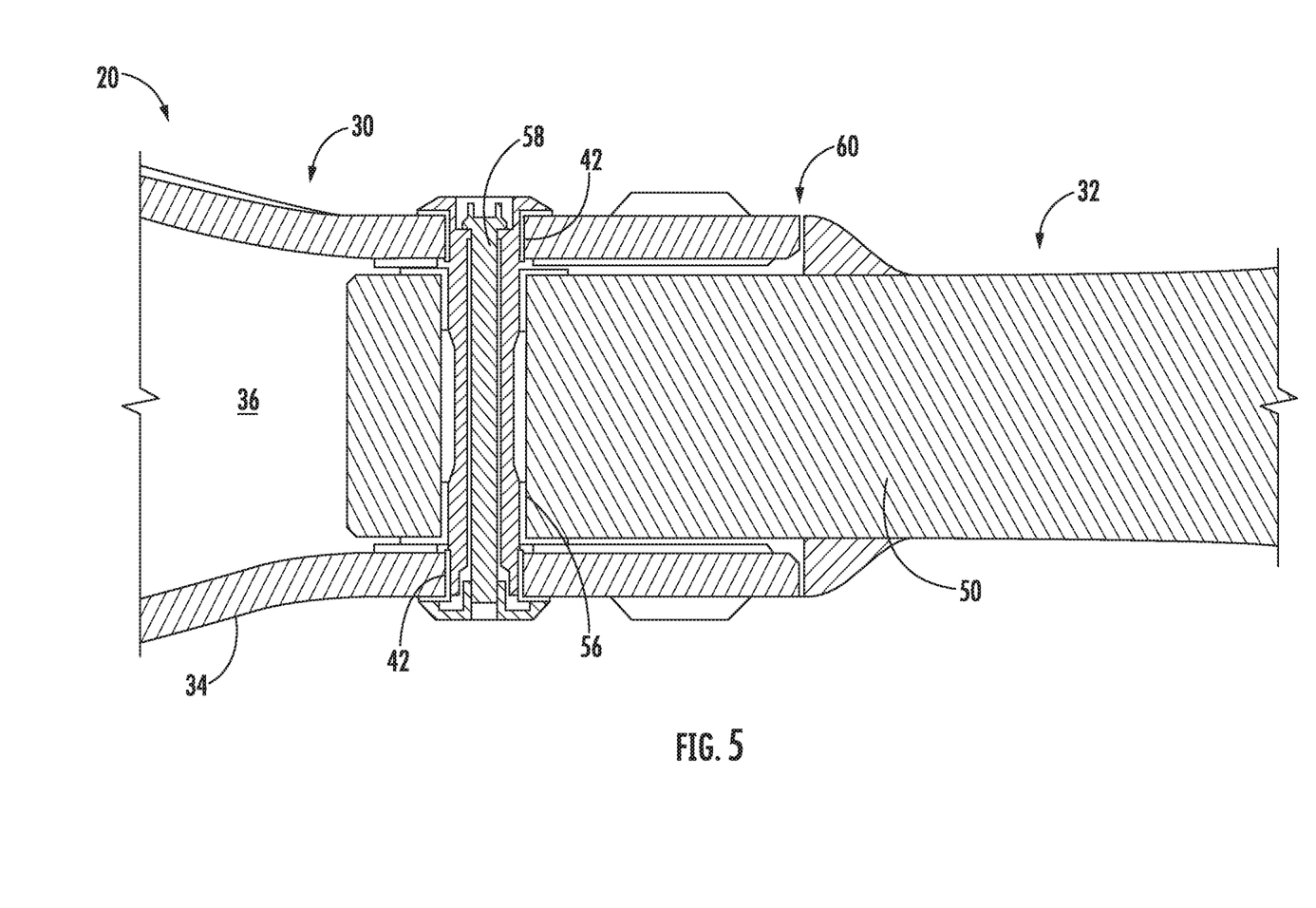
FIG. 5 is another cross-sectional view of a the rotor blade assembly of FIG. 4 taken along line P-P in a normal configuration according to an embodiment.
Figure 7:
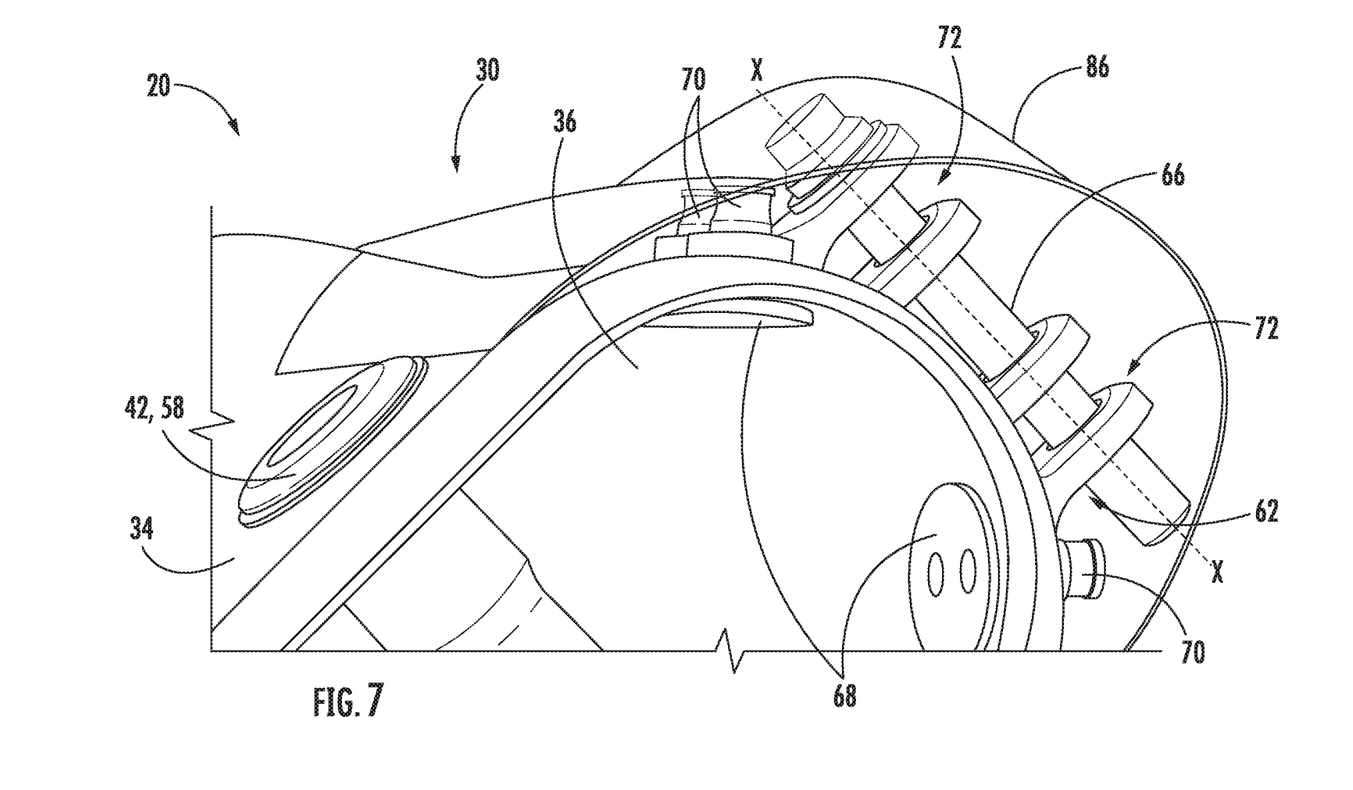
FIG. 7 is a perspective view of a first section of a rotor blade assembly and a corresponding fold assembly according to an embodiment.
Figure 8:
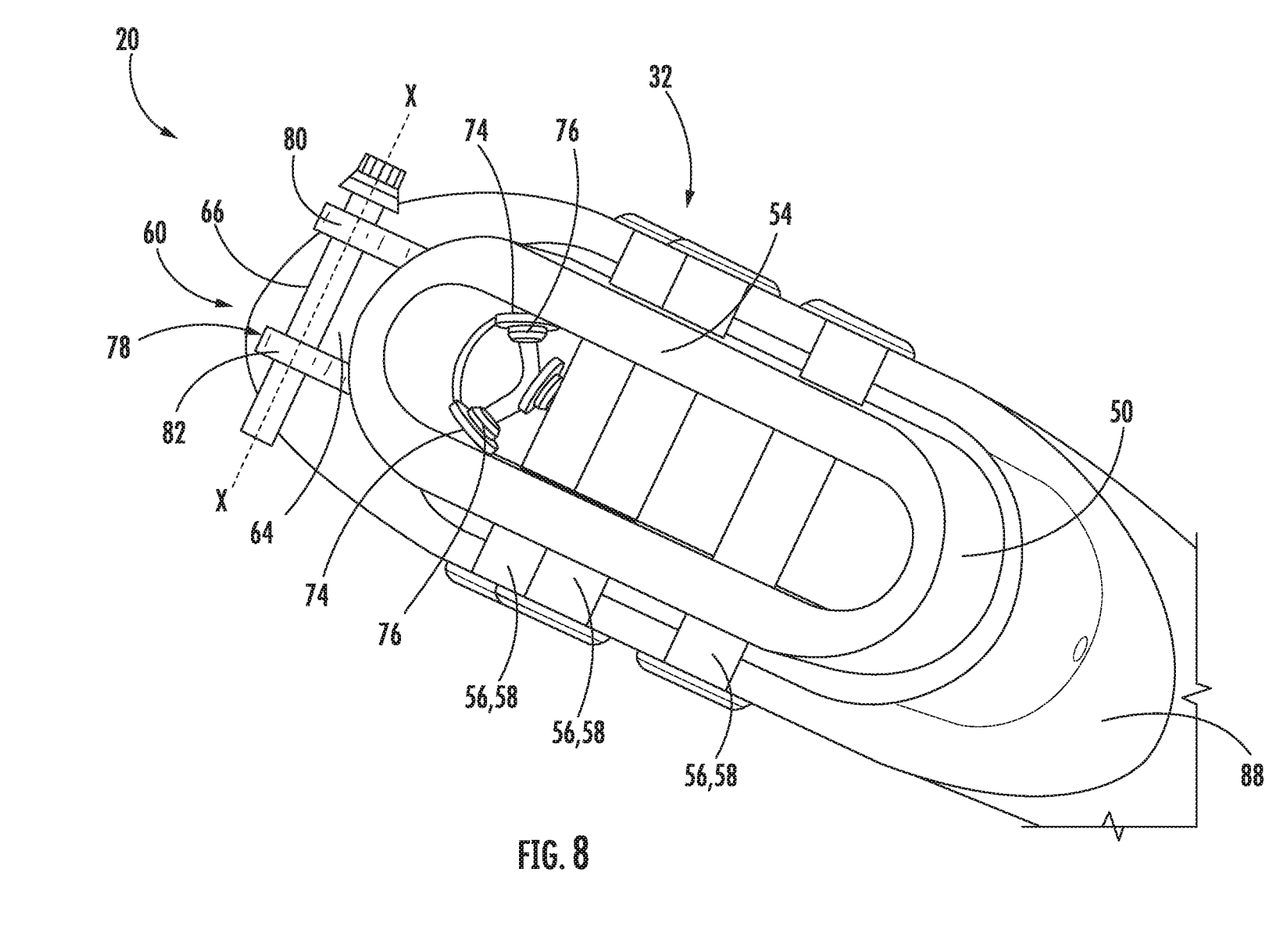
FIG. 8 is a perspective view of a second section of a rotor blade assembly and a corresponding fold assembly according to an embodiment.
Figure 9:
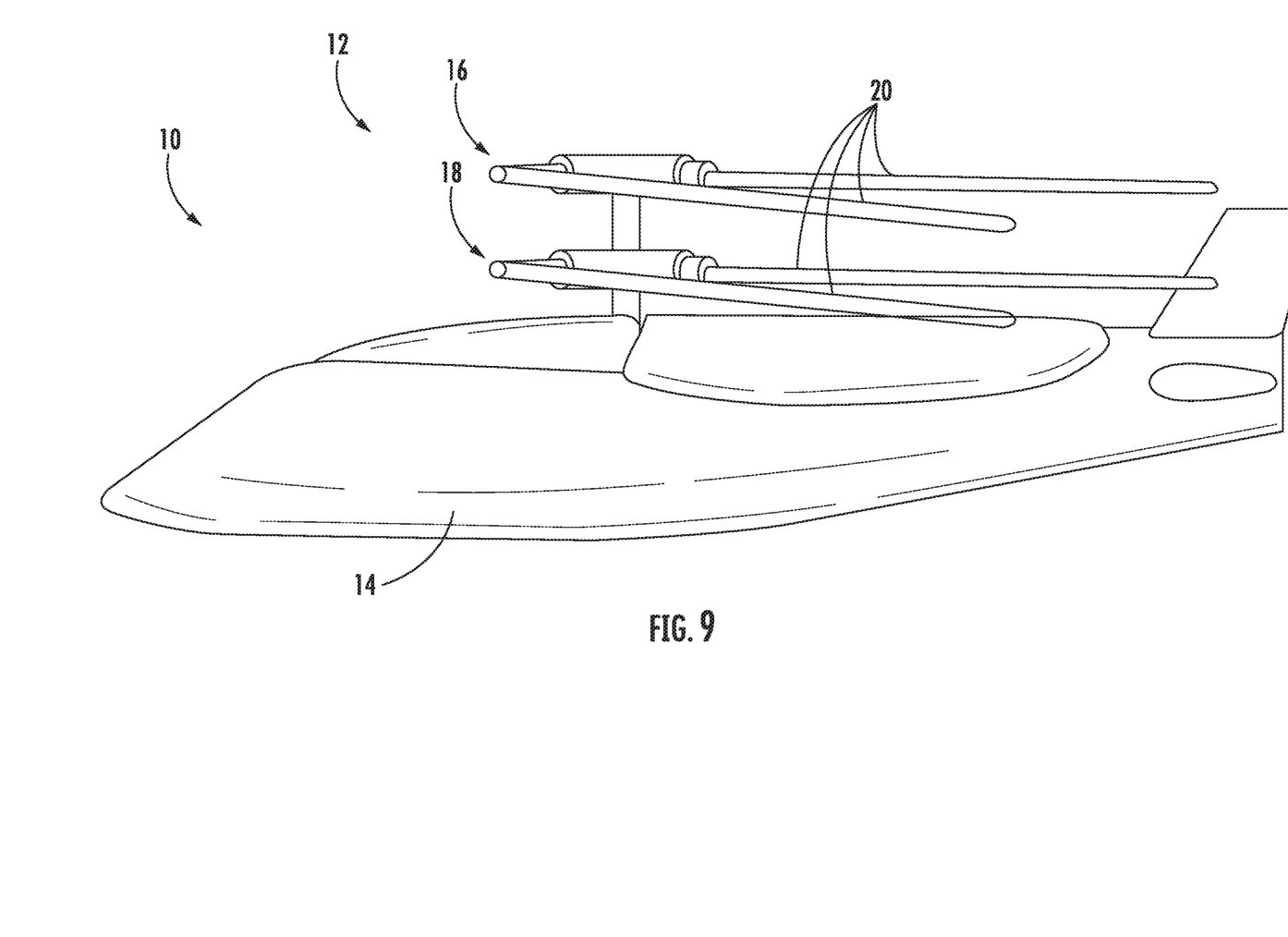
FIG. 9 is a side view of an aircraft having one or more rotor blade assemblies in a folded configuration according to an embodiment.

A fold assembly 60, best shown in FIGS. 5, 7, and 8, additionally couples the first section 30 of the rotor blade assembly 20 to the second section 32 of the rotor blade assembly 20. More specifically, the fold assembly 60 connects the blade spar 50 to the attachment member 34 such that the blade spar 50 is rotatable to a desired angle about a blade fold axis X from an extended position to a folded position. The fold assembly 60 includes a first hinge plate 62 and a second hinge plate 64 coupled via a fastener 66, such as a pin for example. The first hinge plate 62 is located at an exterior surface of the attachment member 34, near the second end 40 thereof. In the illustrated, non-limiting embodiment, best shown in FIG. 7, the first hinge plate 62 includes one or more clamps 68 affixed to the attachment member 34 via one or more fasteners 70. At least one clevis 72 associated with each clamp 68 extends outwardly from the attachment member 34. As shown, the first hinge plate 62 includes an aligned first clevis 72 and a second clevis 72, and a through hole (not shown) extending there through. However, embodiments having only a single clevis 72 or another configuration are also within the scope of the disclosure.

The second hinge plate 64 similarly includes one or more clamps 74 for affixing the second hinge plate 64 to the blade spar 50 via one or more fasteners 76. In the illustrated, non-limiting embodiment, the second hinge plate 64 includes a clevis 78 including a first arm 80 and a second arm 82 extending outwardly therefrom. As shown, the first arm 80 is receivable within an opening defined by the first clevis 72 of the first hinge plate 62 and the second arm 82 is receivable within the opening defined by the second clevis 72 of the first hinge plate 62. The first and second arms 80, 82 includes a through hole (not shown) substantially identical to the through hole formed in the at least one clevis 72 of the first hinge plate 62. Accordingly, where the first and second arms 80, 82 are received within the upper and lower clevis 72, 72, the fastener 66, is insertable within the aligned through holes to rotatably couple the first hinge plate 62 and the second hinge plate 64. The fastener 66 therefore defines the blade fold axis X of the second section 32 of the rotor blade assembly 20 relative to the first section 30. As shown, the blade fold axis may be oriented substantially perpendicular to a chord of the rotor blade assembly 20.

In an embodiment, the rotor blade assembly 20 additionally includes at least one fairing for reducing or minimizing drag at the fold assembly 60. In the illustrated, non-limiting embodiment, the rotor blade assembly 20 includes a first fairing 86 associated with the first section 30 and a second fairing 88 associated with the second section 32. The first fairing 86 is mounted in an overlapping arrangement with the first hinge plate 62 of the fold assembly 60. Similarly, the second fairing is positioned to overlap the second hinge plate 64, and in some embodiments, the blade spar 50, but not the connector 52. The adjacent ends of the first fairing and the second fairing may be complementary to one another.

To transform the rotor blade assembly 20 from a standard or extended configuration to a folded configuration, the first fairing 86 is removed from the adjacent fold assembly 60 of the rotor blade assembly 20. The plurality of fasteners 58 are then removed from the aligned through holes 42 and openings 56 formed in the overlapping portion of the first and second sections 30, 32. The second section 32 is then rotated about the blade fold axis X until reaching a desired position. In the folded configuration, the entire weight of the second section 32 of the rotor blade assembly 20 is supported by the fold assembly 60, and more specifically, by the fastener 66 coupling the hinge plates 62, 64.

Figure 10:
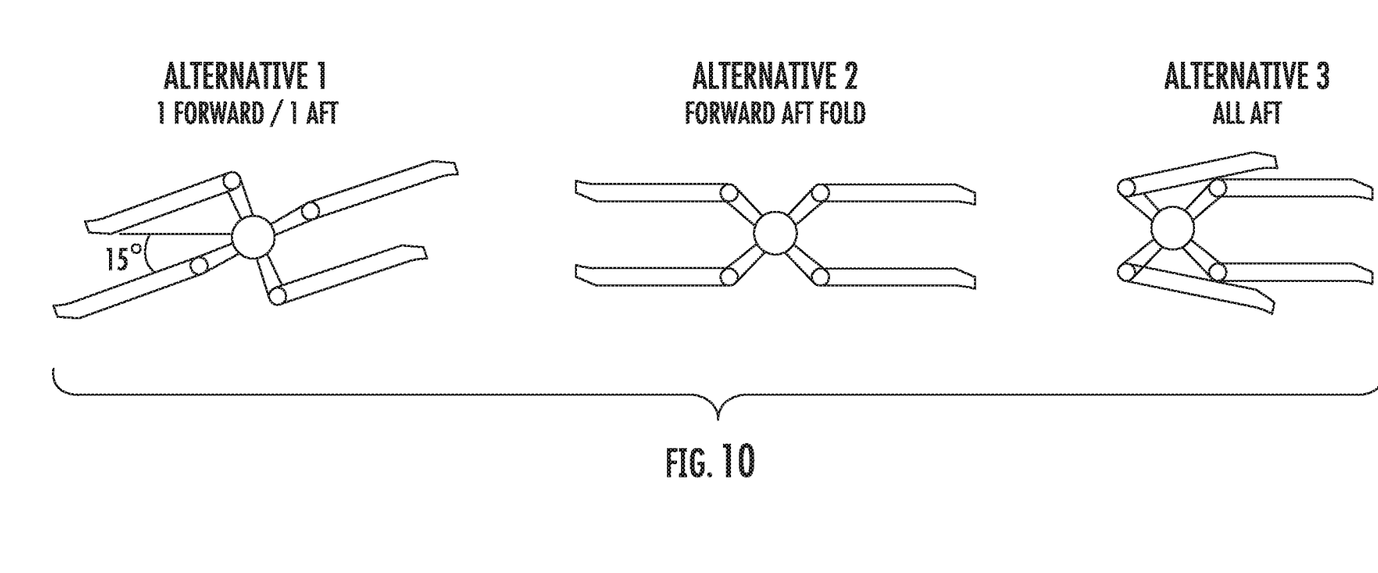
FIG. 10 is a plan view of a rotor assembly having various folded configurations according to an embodiment.

Examples of various folded configurations are shown in FIG. 10. In such embodiments some or all of the rotor blade assemblies 20 of a rotor are configured to fold as described herein. Further, in embodiments where each of the plurality of rotor blade assemblies 20 connected to a rotor is configured to fold, the fold assembly 60 may be mounted to an opposite side of adjacent rotor blade assemblies. For example, the fold assembly 60 may be mounted to a leading edge of a first rotor blade assembly. The fold assembly 60 of the second and third rotor blade assemblies, which are mounted to a rotor hub on opposing sides of the first rotor blade, may be mounted to the trailing edge. This provides for greater flexibility when determining how best to fold the rotor blade assemblies to fit within a desired space.

A foldable rotor blade assembly 20 as illustrated and described herein is able to easily rotate between a normal, extended position and a rotated or folded position. Further, the design allows for all rotor blade assemblies 20 of a rotor system to be folded aft.

The term "about" as used herein may indicate a relative position of a component with respect to a reference based upon the equipment and knowledge available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A foldable rotor blade assembly comprising:
    a first section including a connector assembly including a plurality of through holes;
    a second section including a connector having a plurality of openings, the connector being receivable within a hollow interior of the first section;
    a plurality of fasteners, each of the plurality of fasteners is inserted within one of the plurality of through holes and one of the plurality of openings; and
    a fold assembly operably coupled to both the first section and the second section, the fold assembly defining a blade fold axis about which the second section is rotatable to transform the rotor blade assembly between a normal configuration when the connector is received within the hollow interior of the first section, and a folded configuration when the connector has rotated outside of the hollow interior of the first section.

2. The foldable rotor blade assembly of claim 1, wherein the plurality of through holes includes at least three through holes.

3. The foldable rotor blade assembly of claim 2, wherein the plurality of through holes are arranged in a non-linear configuration.

4. The foldable rotor blade assembly of claim 3, wherein the plurality of through holes form a triangle.

5. The foldable rotor blade assembly of claim 1, wherein an axis defined by one of the plurality of through holes is perpendicular to and intersects a pitch axis of the rotor blade assembly.

6. The foldable rotor blade assembly of claim 5, wherein the plurality of through holes are symmetrically positioned about the pitch axis.

7. The foldable rotor blade assembly of claim 1, wherein when the rotor blade assembly is in the normal configuration, each of the plurality of through holes is aligned with a corresponding one of the plurality of openings.

8. The foldable rotor blade assembly of claim 1, wherein an end of the connector is contoured such that the connector does not contact with first section as the second section rotates about the blade fold axis.

9. The foldable rotor blade assembly of claim 8, wherein the contoured end of the connector is generally rounded.

10. The foldable rotor blade assembly of claim 8, wherein a centerline of a radius of the connector is aligned with the blade fold axis.

11. The foldable rotor blade assembly of claim 1, wherein the fold assembly further comprises:
    a first hinge plate coupled to the first section;
    a second hinge plate fastened to the second section; and
    a pin connecting the first hinge plate to the second hinge plate.

12. The foldable rotor blade assembly of claim 1, wherein in the folded configuration, the second section is supported by the fold assembly.

13. The foldable blade assembly of claim 1, further comprising at least one fairing positioned about the fold assembly.

14. The foldable blade assembly of claim 13, wherein the at least one fairing further comprises:
    a first fairing mounted to the first section; and
    a second fairing mounted to the second section, wherein an end of the first fairing and an adjacent end of the second fairing are generally complementary.

15. A rotary-wing aircraft comprising:
    an airframe;
    a main rotor system supported by the airframe, the main rotor system including a plurality of rotor blade assemblies connected to a rotor hub, the plurality of rotor blade assemblies including:
    a first rotor blade assembly rotatable about a first blade fold axis defined by a first fold assembly mounted to a leading edge of the first rotor blade assembly; and a second rotor blade assembly rotatable about a second blade fold axis defined by a second fold assembly mounted to a trailing edge of the second rotor blade assembly, the first rotor blade assembly and the second rotor blade assembly being positioned about the rotor hub; and wherein each of the first rotor blade assembly and the second rotor blade assembly further comprises:
- a first section including a connector assembly including a plurality of through holes;
- a second section including a connector having a plurality of openings, the connector being receivable within a hollow interior of the first section; and
- a plurality of fasteners, each of the plurality of fasteners being insertable within one of the plurality of through holes and one of the plurality of openings.

16. The rotary wing aircraft of claim 15, wherein the first rotor blade assembly further comprises at least one fairing positioned about the first fold assembly and the second rotor blade assembly further comprises at least one fairing positioned about the second fold assembly.

17. The rotary wing aircraft of claim 15, wherein the first rotor blade assembly and the second rotor blade assembly are mounted opposite one another, and the first rotor blade assembly is foldable about the first blade fold axis relative to the rotor hub in a first direction, and the second rotor blade assembly is foldable about the second blade fold axis relative to the rotor hub in a second direction, opposite the first direction.

18. The rotary wing aircraft of claim 15, wherein the first rotor blade assembly and the second rotor blade assembly are mounted opposite one another, and the first rotor blade assembly is foldable about the first blade fold axis relative to the rotor hub in a first direction, and the second rotor blade assembly is foldable about the second blade fold axis relative to the rotor hub in the same first direction.

19. The rotary wing aircraft of claim 15, wherein the first rotor blade assembly is foldable about the first blade fold axis relative to the rotor hub in a first direction, and the second rotor blade assembly is foldable about the second blade fold axis relative to the rotor hub in the same first direction.

20. The rotary wing aircraft of claim 15, wherein the plurality of rotor blade assemblies are folded relative to the rotor hub in a single direction.

21. A rotary-wing aircraft comprising:
an airframe;
a main rotor system supported by the airframe, the main rotor system including a plurality of rotor blade assemblies connected to a rotor hub, the plurality of rotor blade assemblies including:
- a first rotor blade assembly rotatable about a first blade fold axis defined by a first fold assembly mounted to a leading edge of the first rotor blade assembly, the first rotor blade assembly comprising at least one fairing positioned about the first fold assembly; and
- a second rotor blade assembly rotatable about a second blade fold axis defined by a second fold assembly mounted to a trailing edge of the second rotor blade assembly, the second rotor blade assembly comprising at least one fairing positioned about the second fold assembly, the first rotor blade assembly and the second rotor blade assembly being positioned about the rotor hub;

wherein each of the at least one fairing positioned about the first fold assembly and the at least one fairing positioned about the second fold assembly further comprises:
- a first fairing mounted to a first section of the first rotor blade assembly and a first fairing mounted to a first section of the second rotor blade assembly; and
- a second fairing mounted to a second section of the first rotor blade assembly and a second fairing mounted to a second section of the second rotor blade assembly,
- wherein an end of the first fairing mounted to the first section of the first rotor blade assembly and an end of the first fairing mounted to the first section of the second rotor blade assembly are generally complementary to an end of the second fairing mounted to the second section of the first rotor blade assembly and an end of the second fairing mounted to the second section of the second rotor blade assembly, respectively.

* * * * *